Figure 1:
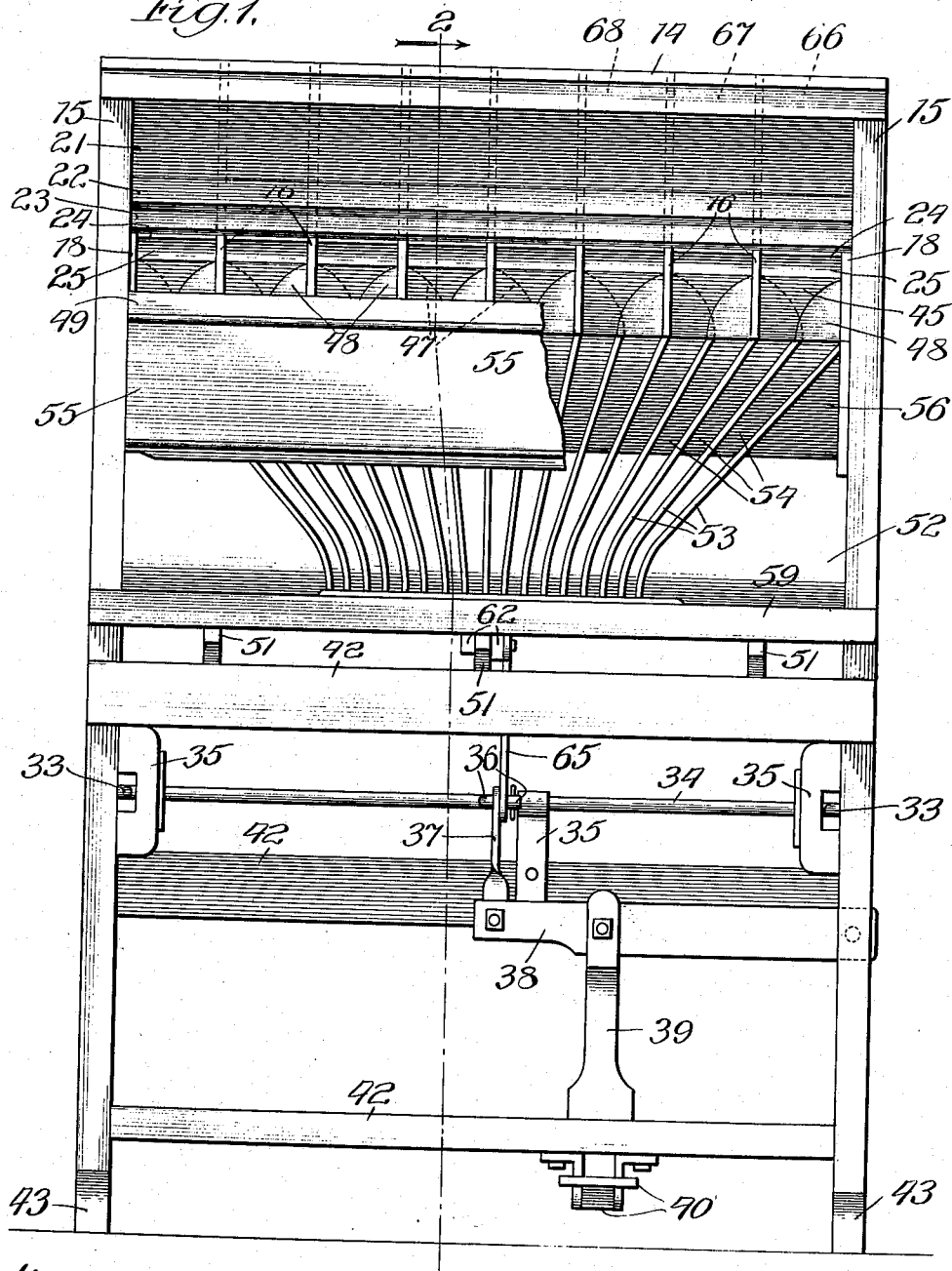

C. B. MANBECK.
CANDLE ASSEMBLING MACHINE.
APPLICATION FILED MAY 17, 1909.

932,796.

Patented Aug. 31, 1909.
5 SHEETS—SHEET 1.

Witnesses:
Chas. E. Gaylord.
Clyde C. Palmer.

Inventor:
Charles B. Manbeck,
By Dyrenforth Lee Chritton & Wiles,
Attys.

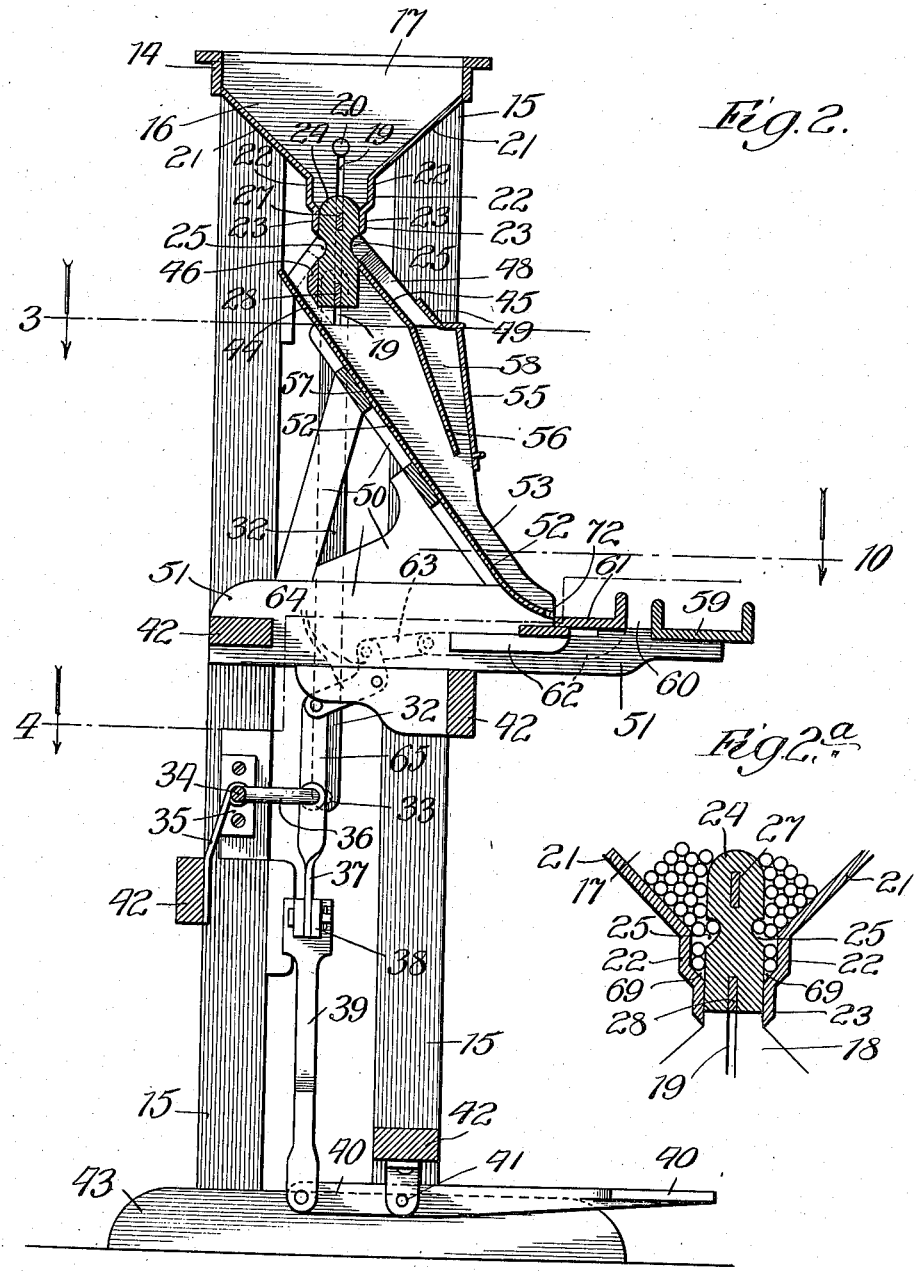

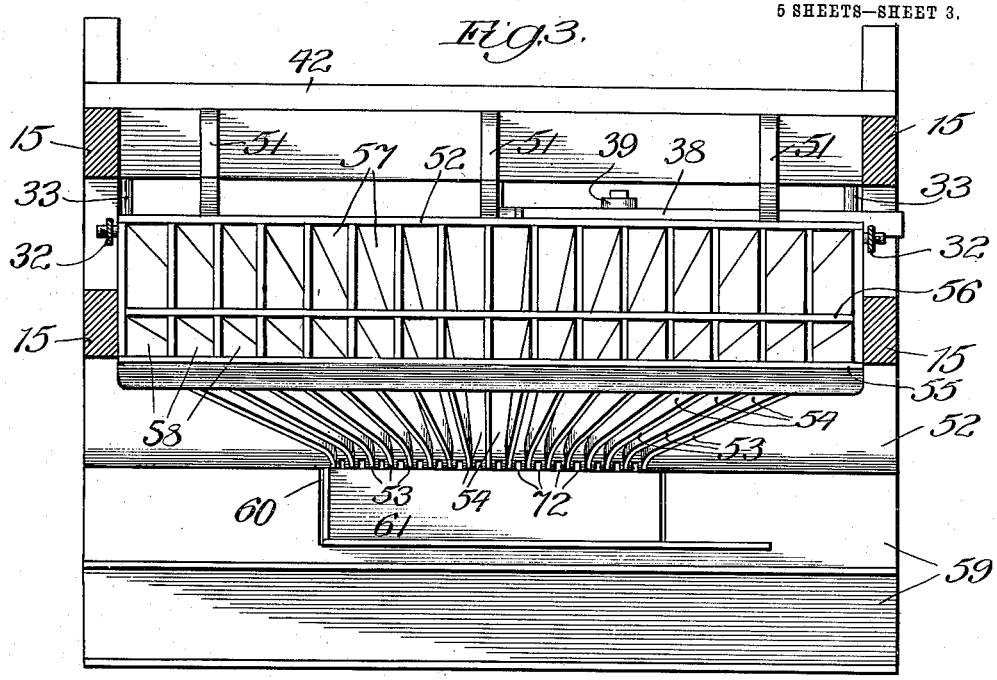
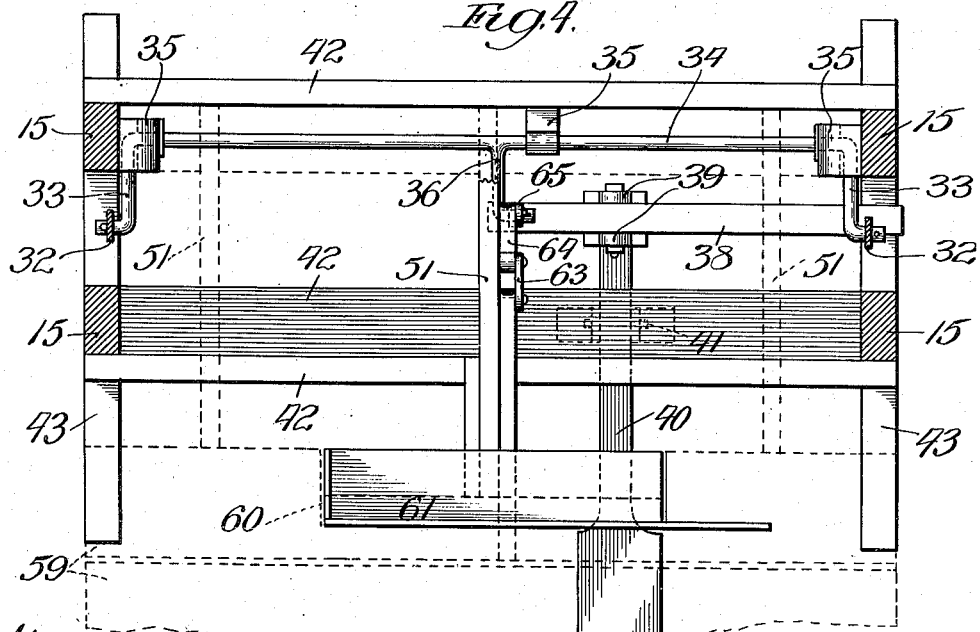

C. B. MANBECK.
CANDLE ASSEMBLING MACHINE.
APPLICATION FILED MAY 17, 1909.
932,796.
Patented Aug. 31, 1909.
5 SHEETS—SHEET 4.
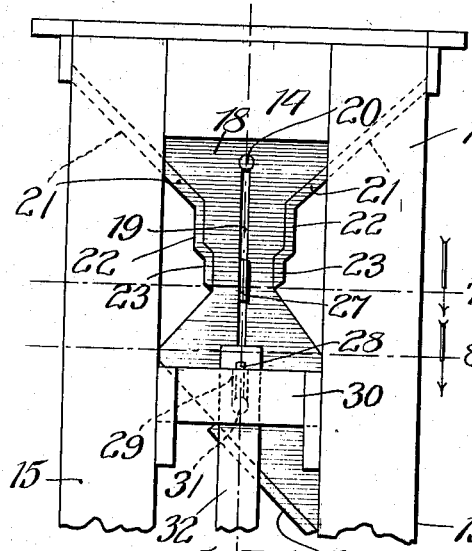
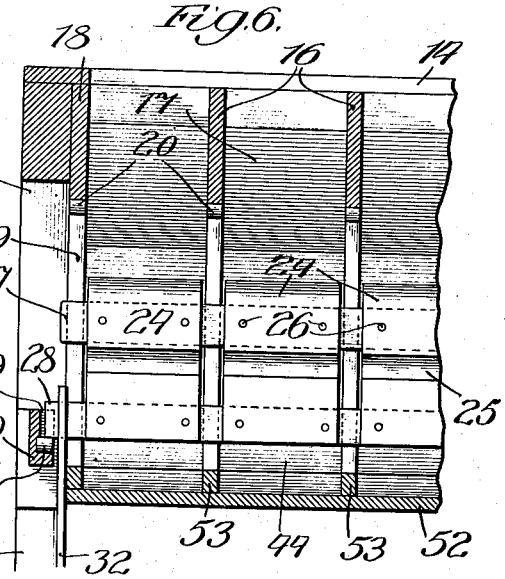
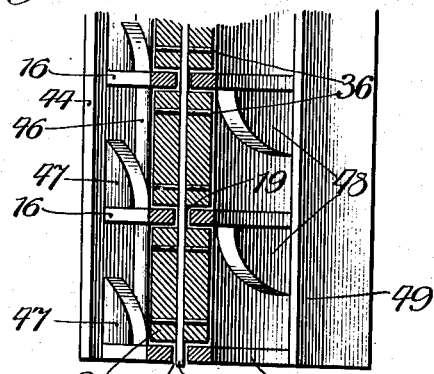
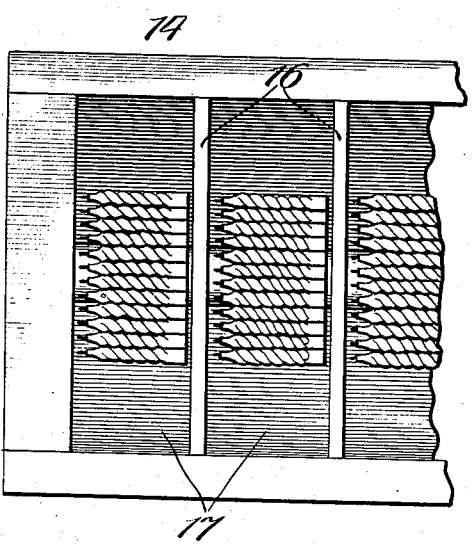
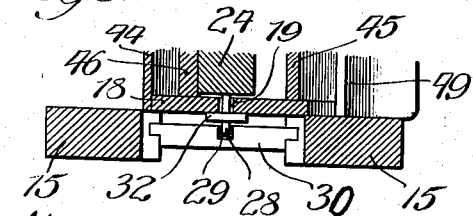
Witnesses:
Chas. E. Gaylord
Clyde C. Palmer
Inventor:
Charles B. Manbeck,
By Dyrenforth, Lee, Chritton & Wiles,
Attys C. B. MANBECK.
CANDLE ASSEMBLING MACHINE.
APPLICATION FILED MAY 17, 1909.
932,796.
Patented Aug. 31, 1909.
5 SHEETS—SHEET 5.
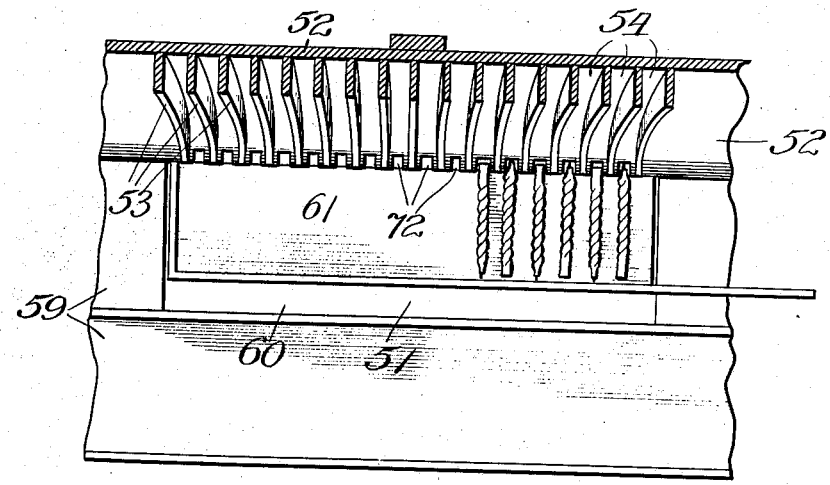
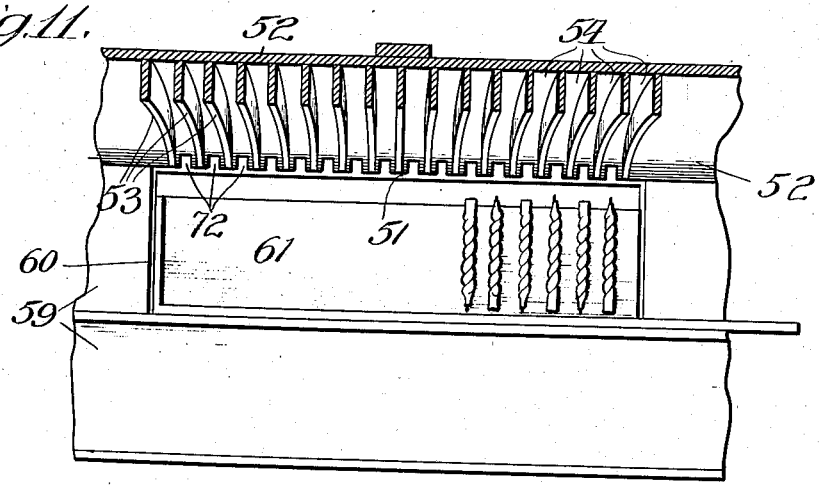
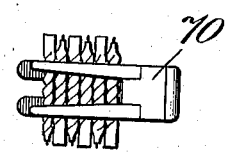
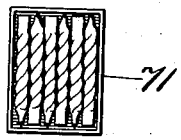
Witnesses:
Chas. D. Gaylord,
Clyde C. Palmer.
Inventor:
Charles B. Manbeck,
By Dyrenforth, Lee, Chritton & Wiles,
Attys.

UNITED STATES PATENT OFFICE.

CHARLES B. MANBECK, OF WHITING, INDIANA, ASSIGNOR TO STANDARD OIL COMPANY, A CORPORATION OF INDIANA.

CANDLE-ASSEMBLING MACHINE.

932,796.  Specification of Letters Patent.  Patented Aug. 31, 1909.

Application filed May 17, 1909. Serial No. 496,595.

*To all whom it may concern:*

Be it known that I, CHARLES B. MANBECK, a citizen of the United States, residing at Whiting, in the county of Lake and State of Indiana, have invented a new and useful Improvement in Candle-Assembling Machines, of which the following is a specification.

My invention relates to an improvement in candle-assembling machines, which I have more particularly devised for use in assorting and arranging candles preparatory to boxing or packing them, and more especially the smaller varieties of candles, or tapers, such as those used for decorating Christmas trees and the like.

In packing tapers it is customary to take an assortment of different colors and place them in layers of a predetermined number in a box, with one layer superimposed upon another and separated each from the other by an interposed sheet of paper. Alternate tapers in each layer extend with their ends pointing in one direction and the intermediate ones point with their tip-ends in the opposite direction. Heretofore it has been the practice to pack boxes in this manner by hand, the packer taking each individual candle of the proper color from a receptacle and placing it in the box in the relative position described. This hand-procedure is slow, arduous and expensive; and the object of my invention is to provide a machine for performing the work, by each operation of which a predetermined number of candles shall be properly grouped for packing, with their tips disposed in the manner above described, ready to be introduced, as a layer, into a box.

Referring to the accompanying drawings—Figure 1 is a broken view in front elevation of my improved machine; Fig. 2 is a view in vertical section at line 2 Fig. 1; Fig. 2ᵃ is an enlarged view in vertical section through a delivery-head showing a portion of a hopper and candles therein; Figs. 3 and 4 are views in plan section, taken respectively at lines 3 and 4, Fig. 2; Fig. 5 is an enlarged broken view of the upper part of the machine in end elevation; Fig. 6 is a broken sectional view on line 6, Fig. 5; Figs. 7 and 8 are broken views in plan section taken respectively on lines 7 and 8, Fig. 5; Fig. 9 is a broken plan view of the hopper portion of the machine; Fig. 10 is a broken view in plan section taken on line 10, Fig. 2, and showing a number of tapers having been assorted by and discharged from the machine to a movable platform; Fig. 11 is a similar view with the platform in a different position; Fig. 12 is a view showing the candles in a gatherer by which they are taken from the platform, and Fig. 13 is a view of a box representing a layer of tapers placed therein.

A hopper 14 supported on legs or standards 15 is divided by transversely arranged partitions 16, into a series of smaller hoppers or compartments 17, of which eight are shown in the drawings, though the number may be greater or smaller. The ends 18 of the hopper and the partitions 16 therein extend down from the top of the machine to the plane of the dotted line 3, (Fig. 2) and are provided with vertical slots 19 extending upward from their lower edges to rubber inserts or buffers 20 embedded in the ends and partitions. The hopper 14, at each side of its longitudinal center, is provided with an obliquely disposed bottom 21 having an offset-portion 22, below which depends a perpendicular wall 23. Within each compartment 17 is arranged a delivery-head 24 in the form of a block having a recess 25 in each side extending throughout its length. These heads are spaced apart and secured by pins 26 to bars 27 and 28 passing through them (Fig. 7) and are of a width to fill the space but permit them to be freely moved between the walls 23. The bars 27 and 28 pass through and are guidingly confined in the slots 19 (Fig. 6) to be moved up and down therein for the purpose hereinafter described; and in the upward movement the bar 27 strikes the buffers 20, which absorb the shock and prevent noise and undue jar to the machine. The bar 28 is somewhat longer than the bar 27, and in the downward movement its ends enter slots 29 formed in cross-pieces 30 and strike inserts or buffers 31 (Figs. 5, 6 and 8), similar to and for the same purpose as the buffers 20.

For raising and lowering the bar 28 and with it the delivery-heads, links 32 are connected with the opposite ends of the bar between the hopper and the cross-pieces 30, and the lower ends of the links are connected with crank-arms 33 formed on a shaft 34 (Fig. 4), which is supported in bearings 35 on the frame of the machine. Between the cranks, an arm 36 projects from the shaft and has a link-connection 37 with an arm 38 fulcrumed to the standards 15 (Fig. 1). A link 39 connects this arm with the inner end of a treadle 40 fulcrumed between its ends, at 41 (Fig. 2), to a cross-bar 42 secured to the standards. The standards and a number of similar cross-bars 42 form the main frame of the machine, which is securely supported in an upright position by feet 43.

Between the hopper-ends 18 and across the various intermediate partitions 16 extend plates 44 and 45 obliquely disposed, and above the former adjacent to each delivery-head 24 (Fig. 2) is a member 46, secured at its ends to the partitions. A block 47, forming a deflector, is secured to one side of each partition, to the plate 44 and upon the member 46, and projects from that partition slightly more than one-half the distance between partitions; and it is formed with a curved face as shown in Fig. 7, and as represented by dotted lines in Fig. 1. A similar deflector 48 is secured to the opposite side of each partition and is attached to the plate 45. The curved faces of the two sets of deflectors are, as shown, disposed to extend in relatively contrary directions; and a covering-strip 49 extends part way over the blocks 48 between the standards 15.

A supplemental frame 50, removably secured upon the main frame of the machine is supported thereon by transverse bars 51 (Figs. 1 and 2), which rest upon one bar 42 at one side of the main frame and embrace at their bifurcated ends another bar 42 at the opposite side thereof. This supplemental frame is provided with an obliquely-disposed plate 52 to extend downwardly from and coincident with the plate 44, terminating in a curve toward its lower edge. To the plate 52 are secured radially-disposed partitions 53 curved at their lower ends, as shown in Fig. 1, to form chutes 54 between them; and a facing-plate 55 extends between the standards 15 and part way down the partitions 53, to which this plate is attached. A longitudinally-disposed dividing-plate 56 is let into these partitions, as shown in Fig. 2, to project downwardly from the plate 45 nearly to the lower edge of the facing 55. Each alternate partition 53 is coincident with a partition 16 above it and the intermediate partitions are overlapped at their tops by the deflectors 47 and 48. The plates 52 and 55, the partitions 53 and the dividing-strip 56 form between them two longitudinal series of pockets 57 and 58 shown in Fig. 3 from which lead the chutes 54. Upon the transverse bars 51 is arranged a table 59 (Figs. 1, 2 and 3), provided with an opening 60 through it, midway of the standards; and a platform 61 flanged along its entire edge and adapted to be moved toward and from the curved edge of the plate 52, is supported on one of the bars. Cleats 62 are attached to the under side of the platform to loosely embrace between them the central bar 51 for guiding the platform as it is moved thereon. A link 63 connects an end of one of the cleats with one arm of a bell-crank 64 fulcrumed on the supplemental frame, and a link 65 connects the other arm of the bell-crank with the arm 36 projecting from the shaft 34 (Fig. 2), so that as the treadle is actuated it thereby imparts horizontal reciprocating movement to the platform, for the purpose hereafter explained.

The operation is as follows: The supply of candles to be boxed is contained in any desired number of the compartments 17, with their tip-ends all pointing in the same direction, as represented in Fig. 9. When it is desired to fill a box with layers each, say, of sixteen candles, all the compartments are supplied with tapers. It is customary to provide these tapers to the trade in various colors and to pack each box with these differently colored tapers in each layer. To this end, the supply in each compartment 17 is of the same color, which varies in the different compartments, and as many colors of tapers may be handled by the machine as there are compartments for containing them; though, of course, similarly colored tapers may form the contents of all the compartments if desired. For simplicity of illustration and explanation, the drawings (Figs. 10 to 13) represent the layer as composed of only six tapers, which may be supposed to have been taken from the first, second and third compartments from the right-hand side of the machine as viewed in Fig. 1, and which are numbered, respectively, 66, 67 and 68, though any group of three hoppers in the machine would work in the same manner, as will be understood from the description of the group selected. Assuming the hoppers 66, 67 and 68 to have been filled, the operator places his foot on the treadle and depresses it, thereby, through the medium of the links 32, raising the series of delivery-heads which pass up into the mass of candles contained in the compartment 17, as shown in Fig. 2ª, displacing them in its rise. This movement carries the grooves 25 in the heads past the pockets 69 formed between the offsets 22 and the heads when in a raised position, thus permitting one of the candles to enter each groove or recess 25. Upon the release of the treadle, the series of heads drop by gravity, thereby returning the parts to their normal position. As this movement takes place the tapers contained in the head-grooves discharge therefrom, when the limit of movement in this direction has been reached, at which time the grooves are below the walls 23, (Fig. 2). The candles in discharging from the grooves encounter the deflectors 47 at one side of the heads which arrest their tip-ends and cause their opposite or butt-ends to swing down to enter pockets of the series 57 (Fig. 3), from which they are conveyed by the chutes 54 to the platform 61 (Fig. 10). At the same time candles in discharging from the grooves in the opposite sides of the delivery-heads encounter in their descent the deflectors 48, which retard their butt-ends, thereby causing their tip-ends to swing downward and enter pockets in the series 58, to be also conveyed by the chutes to the platform. Each time the treadle is depressed to raise the delivery-heads, as described, the platform is moved through its connection with the arm 36 from its innermost to its outermost position, as represented, respectively, by Figs. 10 and 11, or in the direction away from the curved edge of the plate 52, carrying with it the candles previously delivered thereon from which they are removed by a gathering-implement 70 (Fig. 12) and deposited as a layer in a box 71 (Fig. 13). This implement is of peculiar construction and forms the subject of a separate application for Letters Patent filed concurrently herewith.

Upon removal of the tapers from the platform, the operator releases the treadle, and as the delivery-heads drop, as described, the platform is moved simultaneously therewith to its innermost position adjacent to the edge of the plate 52 to receive the next series of candles to be delivered thereto by way of the chutes 54. This describes one complete operation of the machine, which is repeated in like manner in each succeeding operation thereof.

The deflectors 48 direct the tapers tip-end foremost through the chutes 54, while the deflectors 47 direct the tapers which discharge over them butt-end foremost through the chutes upon the platform; and as they pass down the chutes they encounter the curved edge of the plate 52 which changes their oblique movement to a horizontal movement and slightly retards the speed of discharge. When a batch so discharged comes to a position of rest upon the platform, in a layer with the tapers forming it positioned alternately in opposite directions, their outer ends rest against the flange along the outer edge of the platform and their opposite ends are confined in recesses 72 (Fig. 10), which hold them until their movement ceases and prevents them from becoming disarranged or separated by rolling about upon the platform, as they would otherwise tend to do.

What I claim as new, and desire to secure by Letters Patent, is—

1. In a candle-assembling machine, the combination of a plurality of compartments for the candles to be assembled, delivery-heads movable in said compartments, means for moving the heads, a platform, and chutes interposed between said heads and platform, for the purpose set forth.

2. In a candle-assembling machine, the combination of a plurality of compartments for the candles to be assembled, delivery-heads movable in said compartments, means for moving the heads, a platform, chutes interposed between said heads and platform, and deflectors in the paths of the candles discharging from the heads, for the purpose set forth.

3. In a candle-assembling machine, the combination of a hopper containing a series of compartments for the candles to be assembled, delivery-heads movable in the compartments, a movable platform, means for simultaneously moving said heads and platform, and chutes interposed between said heads and platform, for the purpose set forth.

4. In a candle-assembling machine, the combination of a series of compartments for the candles to be assorted, delivery-heads movable in said compartments and provided with candle-receiving recesses in their opposite sides, means for moving the heads and platform, and chutes interposed between said heads and platform, for the purpose set forth.

5. In a candle-assembling machine, the combination of a series of compartments for the candles to be assorted, delivery-heads movable in said compartments and provided with recesses, a movable platform, chutes interposed between said heads and platform and containing notches at their delivery-ends, and means for simultaneously moving said heads and platform, for the purpose set forth.

6. In a candle-assembling machine, the combination with a frame, of a hopper supported thereon and containing a series of compartments, delivery-heads movable in said compartments, a movable platform, chutes interposed between said heads and platform, a shaft mounted on the frame and provided with cranks and an arm, links connecting said cranks and heads, connecting means between said platform and arm, and a treadle fulcrumed on the frame and connected with said arm whereby movement of the treadle actuates said heads and platform, for the purpose set forth.

7. In a candle-assembling machine, the combination of a plurality of compartments for the candles to be assorted, delivery-heads movable in said compartments and containing recesses, a platform, chutes interposed between said heads and platform, and deflectors in the paths of the candles discharging from the heads and provided with curved faces, and means for moving said heads, for the purpose set forth.

8. In a candle-assembling machine, the combination of a plurality of compartments for the candles to be assorted, delivery-heads movable in said compartments and containing recesses, a movable platform, chutes interposed between said heads and platform and containing notches in their delivery-ends, deflectors in the paths of the candles discharging from the heads and provided with curved faces, the faces of the deflectors at one side of the heads extending in one direction and those of the deflectors at the opposite side thereof extending in the contrary direction, and means for simultaneously moving said heads and platform, for the purpose set forth.

9. In a candle-assembling machine, the combination of a series of compartments, delivery-heads movable in said compartments and containing recesses, pockets below said heads for receiving candles therefrom, a movable platform, chutes between said pockets and platform, a treadle, and means connected with the treadle for simultaneously moving said heads and platform, for the purpose set forth.

CHARLES B. MANBECK.

In presence of—
J. G. ANDERSON,
R. A. SCHAEFER.